May 3, 1932. A. G. GEISTER 1,856,629
SCOOPING ATTACHMENT FOR TRACTORS
Filed Aug. 12, 1930 3 Sheets-Sheet 1
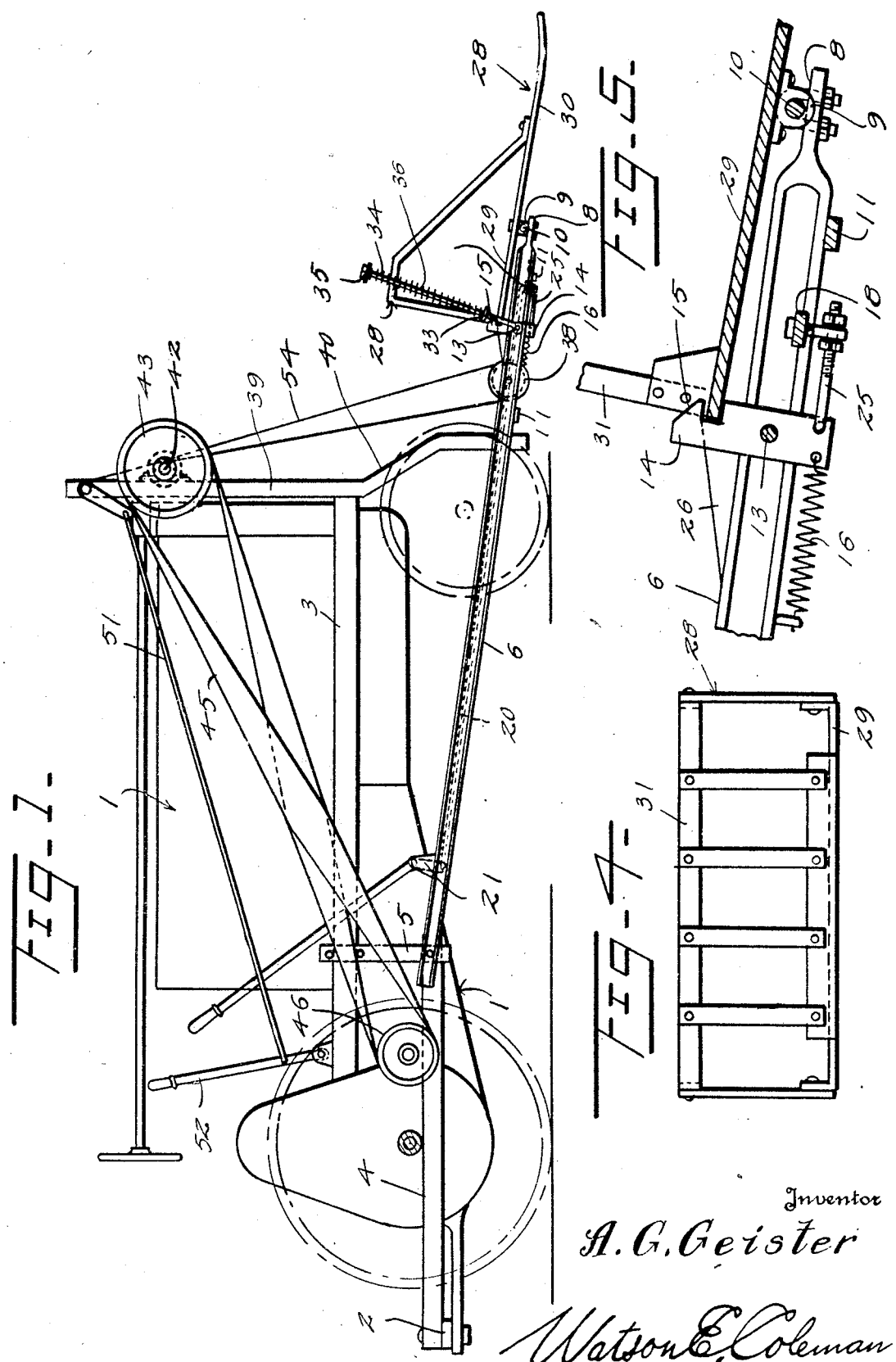

May 3, 1932. A. G. GEISTER 1,856,629
SCOOPING ATTACHMENT FOR TRACTORS
Filed Aug. 12, 1930 3 Sheets-Sheet 2
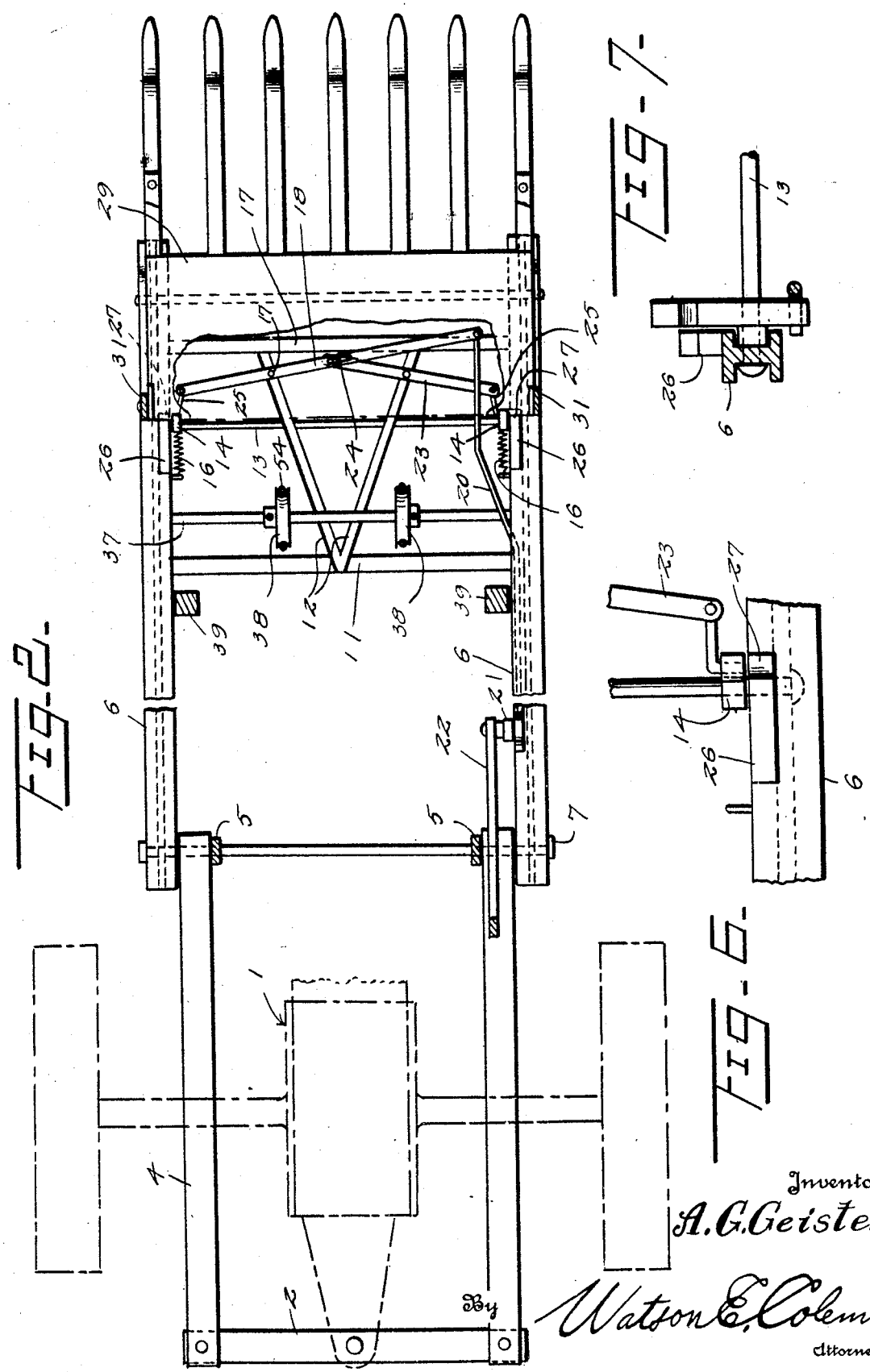
Inventor
A. G. Geister
By Watson E. Coleman
Attorney

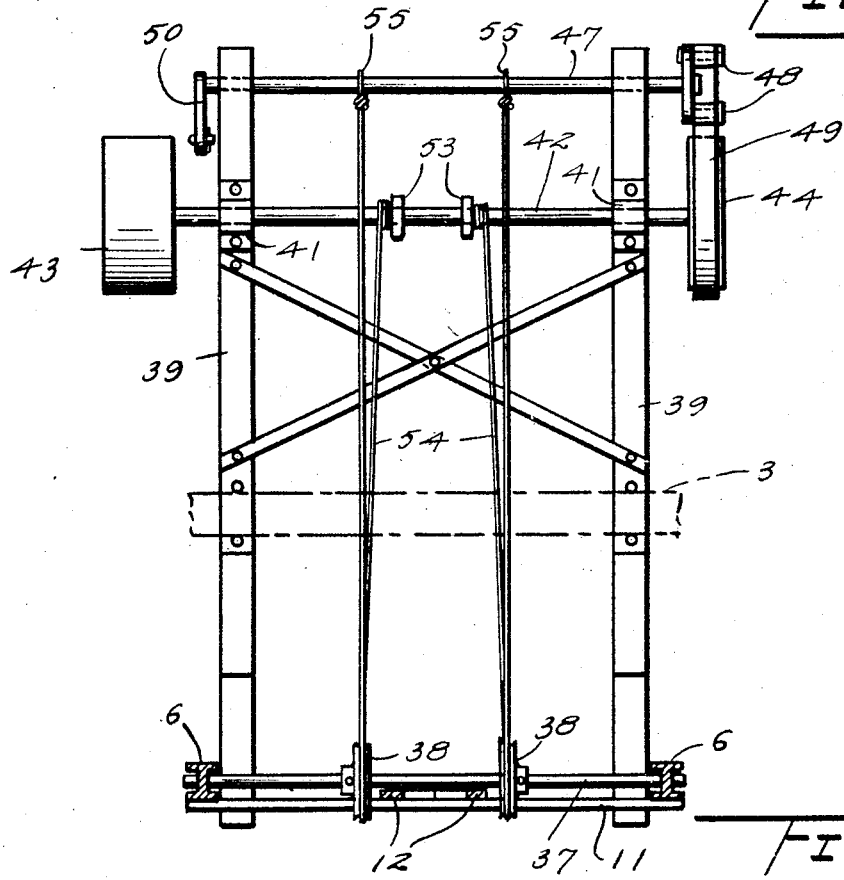

Patented May 3, 1932

1,856,629

UNITED STATES PATENT OFFICE

ALBERT G. GEISTER, OF SANBORN, IOWA

SCOOPING ATTACHMENT FOR TRACTORS

Application filed August 12, 1930. Serial No. 474,866.

This invention relates to improvements in power operated scoops or forks and pertains particularly to a material handling fork mounted for power operation upon a tractor.
The primary object of the present invention is to provide a push fork carried and operated by a tractor so constructed that it may be shoved along the surface of the ground to pick up straw, manure or other material, without digging into the ground.
Another object of the invention is to provide a tractor carried scoop fork having novel and improved means for mounting it upon the tractor whereby strain will not be transferred from the fork structure to the frame of the tractor but will be carried by the tractor draw bar.
A still further object of the invention is to provide a tractor carried fork having associated therewith novel means whereby it may be dumped and automatically returned to its former position, the means by which the fork is returned to operative position being actuated by power developed through the tipping of the fork under the action of gravity, when it is released.
Still another object of the invention is to provide a tractor carried scoop fork which may be raised or lowered for transportation or for a scooping operation and which has associated therewith a braking device whereby the fork may be held in fully raised position or a position intermediate this and fully lowered position.
Other objects and advantages of the present invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.
In the drawings:—
Figure 1 is a view in side elevation of the mechanism embodying the present invention showing the same applied.
Figure 2 is a view in plan of the frame structure and scoop of the mechanism, parts being in section.
Figure 3 is a view in front elevation of the upright structure carried by the tractor, the scoop carrying frame being in cross-section.
Figure 4 is a view in rear elevation of the scoop.
Figure 5 is an enlarged longitudinal section of the rear of the scoop looking toward the adjacent latch showing the latch engaged.
Figure 6 is a detailed top plan view of a latch and shove plate.
Figure 7 is an enlarged sectional view taken transversely of the side of the frame adjacent a latch and looking toward the latter.
Figure 8 is a view in side elevation of a latch and shove plate showing the latch retracted.
Figure 9 is a view in side elevation of the brake drum.
Referring more particularly to the drawings wherein like numerals of reference indicate corresponding parts throughout the several views, the numeral 1 indicates generally a tractor on which the present invention is shown mounted. In the particular make of tractor to which the present scoop fork is adapted to be connected there is mounted at the rear a draw bar 2 which is in a lower plane than the main frame or chassis 3 of the machine. This draw bar 2 has connected thereto a pair of forwardly extending beams 4 preferably of the channel type, these beams being upon opposite sides of the machine and each connected at its forward end to a depending bracket 5 secured to the frame 3.
Extending forwardly from the beams 4 is a scoop fork carrying frame which consists of a pair of side channel beams 6 disposed upon opposite sides of the tractor like the beams 4, and each pivotally secured at its rear end as at 7 to a bracket 5. The forward ends of these beams 6 of the fork frame are flattened as indicated by the numeral 8 and each has mounted thereon a bearing 9 in which is mounted one end of a rock shaft 10, this shaft, of course, connecting the forward ends of these beams together.

Adjacent the forward ends of the beams 6 a pair or more of cross brace bars 11 are mounted to give rigidity to this frame. The brace bars 11 which connect the beams 6 are centrally connected together by a pair of rearwardly converging bars 12.

Extending across between and supported by the beams 6 between the bars 11 is a shaft 13 upon which is mounted adjacent each end a latch 14 which secures the fork, hereinafter described, in working position upon its supporting frame. These latches, as shown, are mounted intermediate their ends and each is formed at its upper end to provide a bill 15 while at its lower end there is connected one end of a spring 16 wh'ch has its other end attached to the adjacent beam. These springs 16 maintain the latches in the proper vertical position.

Pivotally mounted at the point 17 upon one of the bars 12 is a relatively long latch tripping bar 18, one end of which is disposed adjacent one of the latches 14 and is connected thereto by an adjustable link 19, while the other end is disposed adjacent the opposite side of the frame and has connected thereto a pull rod 20 which runs rearwardly along the inner side of the adjacent beam to a point adjacent the pivotal mounting of the beam where it connects with a crank finger 21, pivotally mounted on the beam in the manner shown. This crank finger has operatively connected therewith a lever 22 which extends upwardly to a position where it may be easily reached by an occupant of the tractor so that by oscillation of the lever reciprocation of the pull rod 20 may be effected.

Pivotally mounted intermediate its ends upon the other one of the bars 12 is an auxiliary latch trip bar 23, one end of which is slidably and pivotally attached to the bar 18 substantially midway between its ends as indicated at 24 while the other end is connected by the adjustable link 25, with the other latch 14.

Mounted upon each of the beams 6 adjacent a latch 14 is a shove plate 26 which has in the forward edge thereof a notch or recess 27 which coacts with the bill of the adjacent latch as will be hereinafter more fully described.

Mounted upon and secured to the rock shaft 10 is a scoop fork which is indicated generally by the numeral 28. This fork, as shown, has a floor 29 in the rear thereof in the forward edge of which the relatively long tines 30 extend, the forward ends of these tines being turned up slightly as shown in Figure 1. At the back edge of the floor portion 29 of the scoop fork a slatted upright back 31 is formed which is braced by the bars 32 which connect it with the adjacent side tines 30.

As shown, the pivot about which the fork rotates, or in other words the rock shaft 10, is disposed a substantial distance rearwardly of the transverse center of the fork so that when the fork is loaded the weight thereon would cause it to pitch forwardly if the rear edge were not held down. The rear edge of the fork is normally held down so as to maintain the bottom of the fork in a horizontal plane substantially parallel with the plane in which the beams 6 lie by the latches 16, the bills of which hook over the rear edge of the plate 29 which forms the bottom of the fork.

It will be seen that when the fork is in normal horizontal position the plate 29 will rest upon the bottom edge of each of the notches 27 in a shove plate 26 and will also bear against the vertical edges of these notches.

Pivotally attached to each side of the scoop fork 28 is an eye 33 through which passes a rod 34. The upper end of this rod has attached thereto a collar held in place by a nut 35 and surrounding the rod between the collar and nut 35 and the eye 33 is a coil spring 36. The other end of each rod 34 is pivotally attached to the adjacent end of the shaft 13 on which the latches 14 are pivotally mounted.

Disposed rearwardly of the shaft 13 is a second shaft which is indicated by the numeral 37, this shaft having its ends mounted in bearings carried by the beams 6. Mounted on the shaft 37 is a pair of pulleys each of which is indicated by the numeral 38.

The forward end of the tractor frame 3 has secured thereto a pair of upright beams each of which is indicated by the numeral 39, these beams being placed one adjacent each side of the tractor. At their lower ends the beams 39 are offset slightly as indicated at 40 so that the terminal lower portions will not be in a position to interfere with the turning of the steering wheels of the tractor. These beams 39 are disposed within the scoop fork carrying frame as shown in Figure 2, the beams 6 being in frictional engagement with the beams 39 so that as the scoop fork frame is raised it will be maintained in a vertical path by these upright beams.

Adjacent their upper ends the scoop fork frame guiding beams 39 have mounted on their forward faces bearings 41 in which is supported a transversely extending shaft 42, the ends of which project beyond the beams 39 as shown in Figure 3. This shaft 42 carries on one end a belt drum or pulley 43 and upon its other end a brake drum 44. The pulley 43 is connected by means of a belt 45 with the power take-off pulley 46 of the tractor.

Above the shaft 42 a brake shaft 47 is mounted between the beams 39, one end of the shaft carrying a pair of fingers 48 to which are attached the ends of a brake band 49 which surrounds the drum 44 while the other end of this shaft carries a lever arm 50 to which is attached one end of a pull rod 51 having its other end attached to a control lever 52 pivotally mounted adjacent the rear of the tractor.

Upon the shaft 42 there is mounted in spaced relation a pair of collars 53 and the shaft 42 has attached thereto the ends of a pair of cables 54 which pass downwardly about the pulleys 38 and back up to the brake shaft 47 to which they are attached as indicated at 55. The ends of the cables 54 which are attached to the shaft 42 are wound up on this shaft in the operation of the mechanism and the collars 53 serve to keep the cables separated.

In the operation of the present scoop fork the fork is lowered to the ground while being held down on the beams 6 by the latches 14, as shown in Figure 1, the curved forward ends of the tines lying upon the surface of the ground. The tractor is then moved forward so that the points of the tines are forced under the material to be lifted.

By manipulation of the proper controls upon the tractor power is then transmitted to the pulley 43 which rotates the shaft 42 and winds up the cables 54 thereon thus lifting the forward ends of the beams 6 and the scoop shovel and other mechanism mounted thereon. During the movement of the tractor when the fork is being pushed into the material which is to be transported the plates 26 will receive any strain which might otherwise be applied to the latches 14, particularly if there should be any looseness in the bearing 9. At the same time the rearward thrust of the beams 6 is carried entirely by the draft bar 2 which is attached to the rear of the tractor instead of by the brackets 5 and the frame 3 to which these brackets are attached.

After the load has been lifted to the desired elevation and transported to the place where it is to be dumped, the dumping is effected by pulling the rod 20 to cause the oscillation of the latches 14 in the manner previously described. The load then overbalances the scoop fork so that the latter tips forwardly to allow the load to slip therefrom. When the scoop fork is tipped under the weight of the load the rear end swings up and causes compression of the spring 36 between the eye 33 carried by the scoop and the members 35 at the free end of the rod 34 so that as soon as the load leaves the scoop the spring 36 will react to throw the rear of the scoop downwardly again and cause it to be engaged by the latches 14 to be held in proper position thereby for the reception of another load.

After the scoop has been lifted from the ground by the lifting mechanism it may be held in elevated position so as to permit stopping of the drive belt 45, by the brake band 49. As will be readily seen this is accomplished through the manipulation of the lever 52 to tighten the band 49 upon the drum 44. The band thus holds the shaft 42 against rotation and will not permit the unwinding of the cables 54 therefrom.

From the foregoing description it will be readily seen that the tractor attachment embodying the present invention is of relatively simple design and may be inexpensively constructed. It will also be seen that its use will impose no strain upon the frame structure of the tractor to which it is attached as all of the strain of pushing the scoop into a pile of material is borne by the pull bar at the back of the tractor which is designed to stand such strains.

Having thus described my invention, what I claim is:—

1. In an attachment of the character described for tractors, a frame designed to enclose the forward end of a tractor and project forwardly thereof, means for pivotally attaching the rear of the frame to the tractor, a scoop oscillatably mounted upon the forward end of the frame, latch elements carried by the frame for engaging the rear of the scoop to hold the same against tipping forwardly, means for effecting the release of said latches, means for lifting the forward end of the frame, and strain relieving elements for said latches carried by the frame and opposing any movement of the scoop rearwardly against, and when the scoop is engaged by, the latches.

2. In an attachment of the character described for tractors, including a frame designed to be pivotally attached at one end to the tractor with the opposite end projecting beyond the front thereof and means for raising the same; a rock shaft carried upon the front end of said frame, a scoop mounted upon said rock shaft, said frame including a pair of side beams, a second shaft extending transversely of the frame between said side beams, a pair of latch elements carried by said second shaft and designed to engage said scoop to maintain it in upright position on the frame, a relatively long bar pivotally mounted intermediate its ends on said frame and having adjustable connection at one end with one of said latches, a shorter bar pivotally mounted intermediate its ends upon said frame and having sliding pivotal connection with said first mentioned bar, the other end of said shorter bar having adjustable connection with the other latch member, and a control rod connected at one end to the other end of said first mentioned bar.

3. In an attachment of the character described for tractors, a vertically swinging structure designed to have pivotal connection with the tractor, a scoop oscillatably mounted upon said structure, said scoop being arranged to tip under the action of gravity, latch elements normally maintaining the scoop against tipping, means for raising the structure, and means for automatically returning said scoop to latch engaged position after a tipping operation, comprising a bar having pivotal connection with said structure, a pivotally mounted eye carried by the scoop and having said bar extending therethrough, an element carried by said bar at its free end, and a coil spring surrounding the bar between said eye and said element, said spring being placed under compression when the scoop is tipped for a dumping operation.

4. In a scooping attachment of the character described including a vertically movable frame structure, a fork pivotally mounted upon said frame and including a transverse rear member, a pair of latching elements pivotally mounted upon the frame rearwardly of the fork and adapted to engage the transverse member thereof, a pair of levers pivotally mounted intermediate their ends for oscillation in the same plane beneath the fork, one of said levers being of greater length than the other, the lever of greatest length having one end of the other lever pivotally attached thereto substantially midway between its ends, a connection between the other end of the shorter lever and one end of the longer lever and said latch members, and an actuating element connected with the other end of the longer lever whereby the oscillation of the longer lever will effect the shifting of the latches for the release of the fork.

In testimony whereof I hereunto affix my signature.

ALBERT G. GEISTER.